Feb. 20, 1968  J. C. BRIGHTON ET AL  3,369,427
REMOTE CONTROLLED MIRROR
Filed Oct. 18, 1965  2 Sheets-Sheet 1

INVENTORS.
JOHN C. BRIGHTON
GEORGE E. SCHEITLIN
BY
ATTORNEYS.

Feb. 20, 1968   J. C. BRIGHTON ET AL   3,369,427
REMOTE CONTROLLED MIRROR
Filed Oct. 18, 1965   2 Sheets-Sheet 2

INVENTORS.
JOHN C. BRIGHTON
GEORGE E. SCHEITLIN
BY
ATTORNEYS.

United States Patent Office 3,369,427
Patented Feb. 20, 1968

3,369,427
REMOTE CONTROLLED MIRROR
John C. Brighton and George E. Scheitlin, Columbus, Ind., assignors to Arvin Industries, Inc., Columbus, Ind., a corporation of Indiana
Filed Oct. 18, 1965, Ser. No. 497,287
7 Claims. (Cl. 74—501)

ABSTRACT OF THE DISCLOSURE

A remote controlled rear view mirror having a housing containing a support block from which a plurality of pins are biased outwardly. The pins pivotally engage a mirror carried in the housing to form a plurality of pivot points for said mirror. A plurality of cables are connected at one of their ends to the mirror at said pivot points and at their opposite ends to a control member for moving said cables to tilt said mirror.

---

This invention relates to a rear view mirror, and more particularly to a remotely controlled rear view mirror for an automotive vehicle.

It is an object of the invention to provide a rear view mirror which can be mechanically controlled from a remote point, which will have a wide range of adjustment, which will be releasably retained in the desired position of adjustment, which can be of a compact size, and which can be economically manufactured and easily assembled.

In accordance with one form of the invention, there is provided a rearwardly open housing carried on a base mountable on an automotive vehicle. The mirror is supported in the open end of the housing in a carrier. A support block is mounted within the housing to support and guide a plurality of control cables extending outwardly from the support block for connection to the mirror carrier at a plurality of spaced points. A pivot pin is disposed around each of said cables between the support block and mirror carrier and is spring biased outwardly toward said carrier for pivotal engagement therewith to thus form a plurality of pivot points about which the mirror can be adjustably moved upon movement of the control cables.

The control cables extend outwardly from the housing and its supporting base for connection to a control assembly located at a remote point from the mirror, such as in an automotive vehicle. The control assembly comprises a base having an actuator swivelly mounted thereon and provided with a control handle. The cables are connected to the actuator at a plurality of spaced points whereby movement of said actuator will cause said cables to move the mirror within the housing into the desired position of adjustment. Desirably, said actuator may be spring-biased to act in combination with the spring-biased pivot pins to help control the tension on the cables and retain the mirror carrier in its operative position against said pivot pins.

Other objects and features of the invention will become apparent from the more detailed description which follows and from the accompanying drawings, in which.

Figure 1:
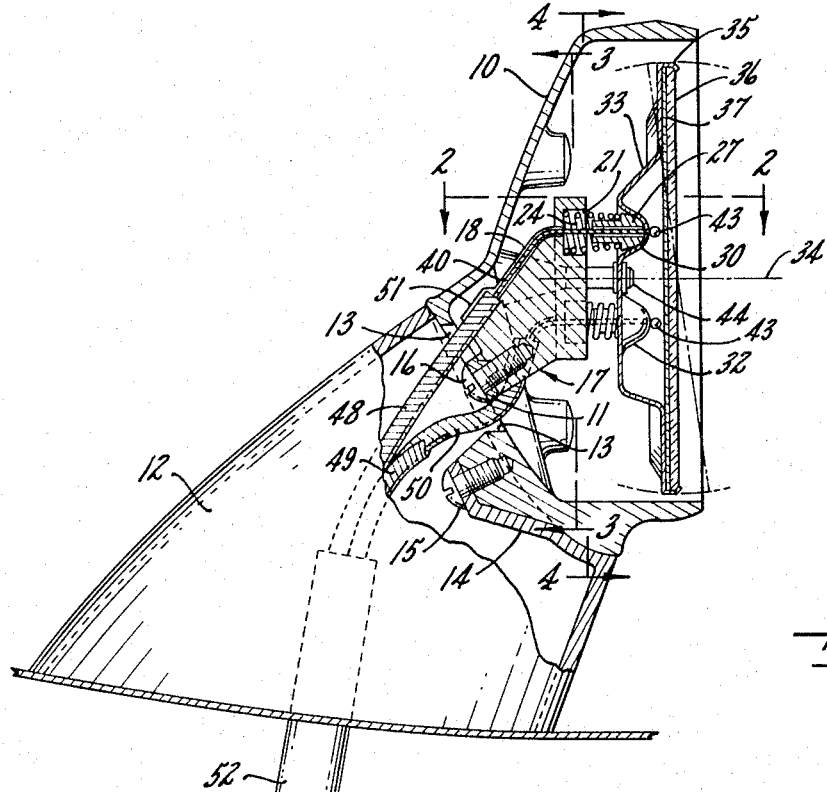
FIG. 1 is a sectional view of a remotely controlled rear view mirror assembly embodying the invention.

As shown, the mirror assembly comprises a rearwardly open housing 10 mounted adjacent its forward end on a base 12 adapted to be mounted on an automotive vehicle in any convenient manner. The base 12, which is hollow, has its open upper end in open communication with openings 13 formed in the housing at its connection to said base. A web 14 extends across the interior of the base to receive a screw 15 for fixedly mounting the housing on said base.

Figure 2:
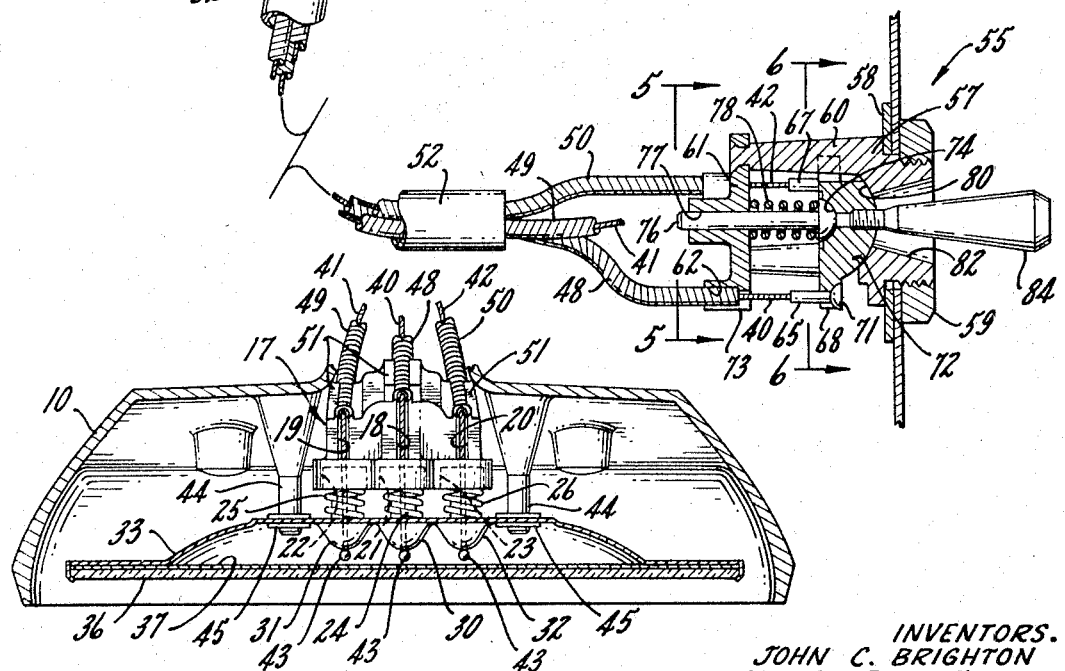
FIG. 2 is a horizontal section taken on the line 2—2 of FIG. 1.

A support block 17 is mounted within the housing at its forward end as by a screw 16 extending through a web 11 in the housing. As shown in FIG. 2, the support block has three channels 18, 19, and 20 formed in its outer face and terminating at the rearward end of the support block in three recesses 21, 22, and 23. The recesses 21-23 are disposed in spaced relation to each other and are spaced from the center of the rear face of the support block. Three coil springs 24, 25, and 26 are carried in the recesses 21-23 and project rearwardly therefrom. Pivot pins 27, 28, and 29 are carried in the springs 24-26 with their rearwardly presented heads pivotally carried in recesses 30, 31, and 32 formed in the front face of a mirror carrier 33. The ends of the springs 24-26 are disposed against the recesses 21-23 and the heads on the pins 27-29 to urge said pins and thus the mirror, rearwardly with respect to the support block. The recesses 30-32 lie in a common plane and are spaced from each other and about the center point or axis 34 of the carrier, the spacing between the recesses 30-32 corresponding to the spacing between the recesses 21-23. As shown in FIG. 1, the carrier 33 is provided with a peripherally extending flange 35 received around the edges of a rearwardly presented mirror 36. Conveniently, a pad 37 is interposed between the mirror 36 and carrier 33 to cushion said mirror against the carrier.

The carrier 33 is held against the heads of the pins 27-29 by three cables 40, 41, and 42 slidably carried in the channels 18-20, respectively, and projecting through openings formed in the pins 27-29, respectively. The cables 40-42 extend outwardly through the pins 27-29 and openings in the carrier recesses 30-32 and are provided with weld beads 43 or other suitable enlargements at their ends abutting the rear carrier face. In this manner, the cables 40-42 will tend to pull the carrier 33 forwardly against the springs 24-26 and pins 27-29 to thus support said carrier on said pins and control the positioning of the mirror as will be more fully described hereinafter.

Figure 3:
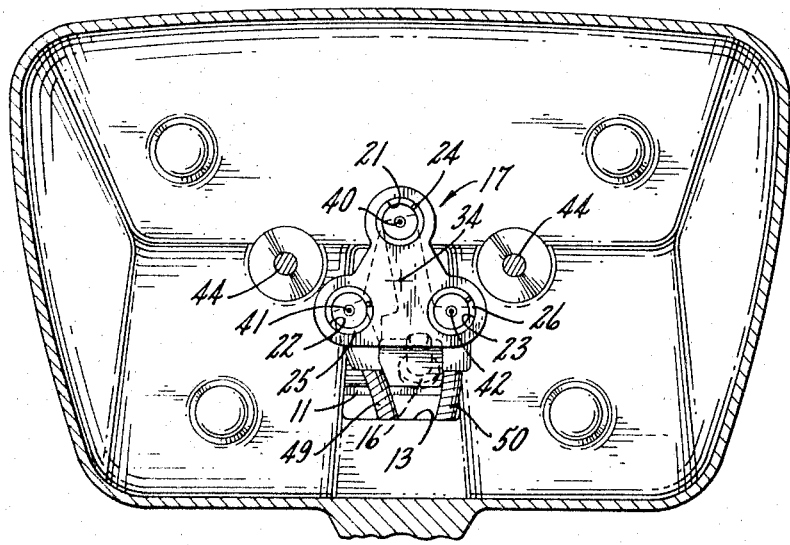
FIG. 3 is a vertical section taken on the line 3—3 of FIG. 1.
Figure 4:
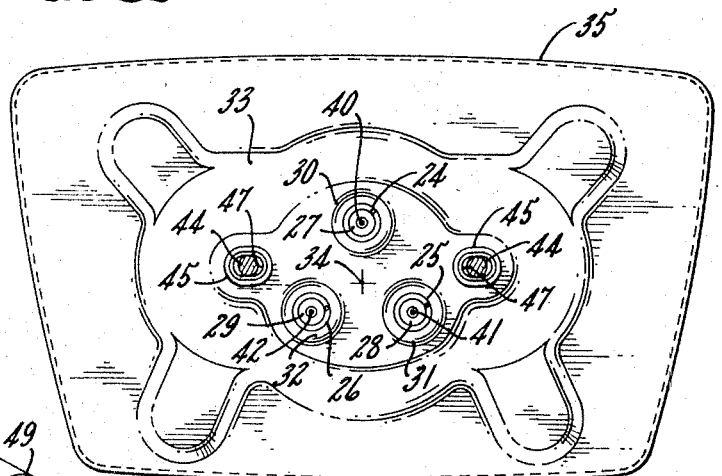
FIG. 4 is a vertical section taken on the line 4—4 of FIG. 1.
Figure 5:
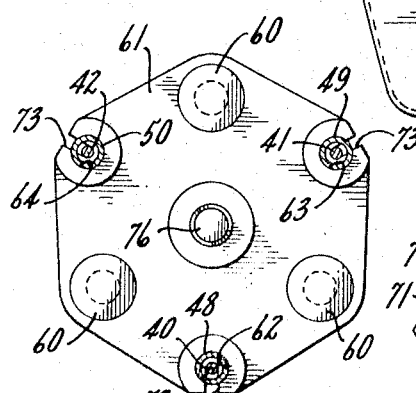
FIG. 5 is a vertical section taken on the line 5—5 of FIG. 1.
Figure 6:
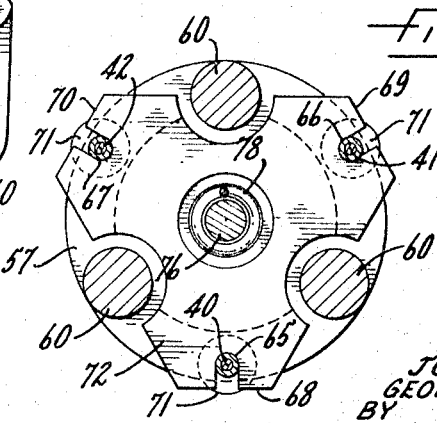
FIG. 6 is a vertical section taken on the line 6—6 of FIG. 1.

Desirably, as shown in FIG. 3, a pair of rearwardly projecting tapered studs 44 are formed on the housing 10 on opposite sides of the support block 17 and project through openings formed in the carrier 33 fitted with plastic bushings 45 to prevent the mirror and carrier from rotating within the housing. The studs 44 act in combination with the springs 24-26 and cables 40-42 to stabilize the carrier within the housing, but the taper of the studs permits the bushings 45 to rock on said studs during adjustment of the mirror so that said studs will not interfere with the adjusting movements of the mirror. Conveniently, lips 47 project inwardly on the bushings to engage the studs to help absorb vibrations of the mirror and carrier. While said studs have been described as mounted on the housing 10, it is to be understood, of course, that they can be mounted on the support block 17.

The cables 40-42 are carried in sheaths 48, 49, and 50, respectively, having their ends adjacent the mirror fixedly connected to the support block 17 as by crimping the forward ends of the channels 18-20 over said sheaths, as at 51. The sheaths and cables extend outwardly through the housing openings 13 and are carried in a conduit 52 leading through the base 12 for connecting the cables and sheaths to control assembly 55 adapted to be mounted within the automotive vehicle at a point remote from the mirror. As shown in FIG. 1, the assembly 55 comprises a base 57 mountable in an opening in the vehicle door or dash panel by a washer 58 and nut 59. The base 57 has a plurality of forwardly projecting arms 60 connected to a guide plate 61. Said guide plate is provided with recessed openings 62, 63, and 64 to which the ends of the sheaths 48–50 are fixedly connected, as at 73. The cables 40–42 project rearwardly through the openings 62–64 and are provided at their ends with ferrules 65, 66, 67 releasably retained in openings 71 formed in arms 68, 69, and 70 on an actuator 72. The openings 71 and the ends of the ferrules 65–67 are rounded to form ball and socket joints to permit universal movement of the ferrules with respect to the sockets. The arms are angularly spaced on the actuator, and where it is desired to have greater mirror tilting movement in proportion to the actuator movement, the openings 71 are radially spaced from the axis of the actuator 72 a greater distance than the radial spacing of the recesses 30–32 from the carrier axis 34 to thus increase the tilting movement of the mirror upon movement of the actuator. Said actuator is provided with a semispherical recess 74 at its forward and which is pivotally received on the head of a pin 76 projecting forwardly from the actuator 72 and slidably received in an opening 77 formed on the guide plate 61. A spring 78 is carried on the pin 76 with its opposed ends bearing against the guide plate 61 and the head of the pin 76 for thus urging the actuator 72 away from said guide plate and tensioning the cables 40–42. The rearward face of the actuator 72 is spherically shaped and is pivotally carried against a spherically shaped face 80 on the base 57 by the spring 78 in the manner of a ball and socket joint. A frustoconical opening 82 is formed in the end of the base 57 for the reception of a handle 84 connected to the rear face of the actuator 72 whereby said handle is free to swivelly move the actuator with respect to the base.

The spring 78 causes the cables 40–42 to hold the carrier 30 against the heads of the pins 27–29 and thus retain said carrier on the pins. The springs 24–26, which are in compression, create a counter force tending to move the pins 27–29 and thus the adjacent ends of the cables 40–42 rearwardly in the housing 10 (to the right as viewed in FIG. 1) so that the carrier will be retained on the pins and tension will be maintained on the cables irrespective of the positioning of the mirror 36. If desired, the spring 78 can be omitted, in which case the cables 40–42 are pulled taut to compress the spring 24–26 and said cables are retained in such condition by the ferrules 65–67 being retained on their respective actuator arms and the sheaths 48–50 retaining a fixed spacing between the support block 17 and guide plate 61.

The pins 27–29 define three separate pivots about which the mirror 36 can be moved for moving it into the desired position of adjustment within the housing. Said three pivots correspond to the three arms 68–70 on the control assembly 55 so that tilting movement of the handle 84 produces a tilting movement of the mirror 36. If, for example, the handle 84 is moved upwardly as viewed in FIG. 1, a pull will be created on the cable 40 to pull the upper end of the mirror to the left as viewed in FIG. 1 about the pivots defined by the pins 27–29. As the tension is increased on the cable 40 for such movement a corresponding decrease in tension will be created on the cables 41 and 42 to thus permit the lower end of the mirror to swing to the right as viewed in FIG. 1. If desired to tilt the mirror laterally, for example to move the right side of the mirror upwardly as viewed in FIG. 2, the handle 84 is moved to increase the tension on cable 42 and relieve the tension on cable 41 to thus cause the carrier 33 to pivot about the pins 27–29 to effect the desired tilting. As will be apparent this structure provides a tilting mechanism in which there is no fixed pivot axis for the mirror so that said mirror has a different tilting axis in each of its positions of adjustment.

We claim:

1. A remote controlled mirror, comprising a housing, support means carried in said housing, a mirror, a carrier connected to said mirror, a plurality of pins biased outwardly from said support means at a plurality of positions spaced about the center of said support means and pivotally engaging said carrier at a plurality of spaced points to form a plurality of pivot points for said mirror at said spaced points, a plurality of cables connected to said carrier at said plurality of spaced points holding said carrier in engagement with said pins and movable for moving said mirror into the desired position of adjustment, and means for moving said cables.

2. A remote controlled mirror, comprising a housing, support means carried in said housing, a mirror, a carrier connected to said mirror, a plurality of pins pivotally engaging said carrier at a plurality of points in spaced relation to a line intersecting the center of said support means and forming a plurality of pivot points for said mirror thereat, said pins being carried in a plurality of springs acting between said support means and pins to cause said pins to urge said carrier away from said support means, a plurality of cables extending through said pins and springs and connected to said carrier at said plurality of points, said cables being tensioned to hold said carrier in engagement with said pins and being movable for moving said mirror into the desired position of adjustment, and means for moving said cables.

3. A remote controlled mirror, comprising a housing, a support block carried in said housing and having a plurality of channels terminating at one of their ends in a plurality of recesses spaced about the center of said support block, a mirror, a carrier connected to said mirror, a plurality of pins pivotally engaging said carrier at a plurality of spaced points to form a plurality of pivot points for said mirror thereat, a plurality of springs seated in said recesses to support said pins and urge said pins into engagement with said carrier, a plurality of cables slidably carried in said channels and in openings in said pins and connected to said carrier at said plurality of spaced points for holding said carrier in engagement with said pins and moving said mirror into the desired position of adjustment, said cables being tensioned to pull the carrier toward said pins, and means for moving said cables.

4. A remote controlled mirror, comprising a housing having an open rear face and an opening at its forward end, a hollow base connected to the open forward end of said housing, a support block carried in said housing and having a plurality of channels terminating at the rear face of said block in a plurality of recesses, a carrier, a mirror mounted in said carrier with its reflective face disposed adjacent the open rear housing face, a plurality of springs seated in said recesses, a plurality of pins in said springs projecting rearwardly therefrom and pivotally engaging the front face of said carrier at a plurality of spaced points to form a plurality of pivot points for said mirror thereat, a plurality of cables slidably carried in said block channels, springs and openings in said pins and connected to the rear carrier face at said plurality of spaced points for holding said carrier in engagement with said pins and moving said mirror into the desired position of adjustment, said cables extending through the opening in the front housing face and the base for connection to means for moving said cables.

5. A remote controlled mirror as set forth in claim 4 in which each of said cables is slidably carried in a sheath, said sheaths being fixedly connected at their ends to said support block and said means.

6. A remote controlled mirror, comprising a housing, a mirror carried in said housing, a carrier connected to said mirror, a support block carried in said housing, means operatively interconnected to said support block and pivotally engaging said carrier at a plurality of spaced points to form a plurality of pivot points for said mirror thereat, a plurality of cables connected to said carrier at said plurality of spaced points and movable for moving said mirror about said pivot points into the desired position of adjustment, a plurality of studs on said support block receivable in openings formed in said carrier tiltably supporting said mirror and preventing said mirror from rotating with respect to said support block and means for moving said cables.

7. A remote controlled mirror, comprising a housing, a mirror carried in said housing, a carrier connected to said mirror, a support block carried in said housing, means operatively interconnected to said support block and pivotally engaging said carrier at a plurality of spaced points to form a plurality of pivot points for said mirror thereat, a plurality of cables connected to said carrier at said plurality of spaced points and movable for moving said mirror into the desired position of adjustment, a plurality of tapered studs on said support block receivable in openings in said carrier, bushings mounted in said openings and having lips engaging said studs whereby said studs tiltably support said mirror and prevent said mirror from rotating with respect to said support block, and means for moving said cables.

References Cited
UNITED STATES PATENTS

| | | | |
|---|---|---|---|
| 2,931,245 | 4/1960 | Jacobson | 74—501 |
| 3,030,821 | 4/1962 | Jacobson | 74—501 |
| 3,046,840 | 7/1962 | Barcus | 74—501 |
| 3,057,262 | 10/1962 | Jacobson | 74—501 |
| 3,277,248 | 10/1966 | Melvin | 74—471 X |
| 3,283,607 | 11/1966 | Van Noord | 74—501 |

FRED C. MATTERN, Jr., *Primary Examiner.*

C. F. GREEN, *Assistant Examiner.*